Dec. 15, 1959  H. L. LA MONACA  2,917,119
VINE LIFTING ATTACHMENT

Filed July 18, 1957  2 Sheets-Sheet 1

INVENTOR.
Hugh Louis La Monaca
BY Victor J. Evans & Co.
ATTORNEYS

Dec. 15, 1959   H. L. LA MONACA   2,917,119
VINE LIFTING ATTACHMENT

Filed July 18, 1957   2 Sheets-Sheet 2

INVENTOR.
Hugh Louis LaMonaca
BY Victor J. Evans & Co.
ATTORNEYS

United States Patent Office 2,917,119
Patented Dec. 15, 1959

2,917,119

VINE LIFTING ATTACHMENT

Hugh Louis La Monaca, Hammonton, N.J.

Application July 18, 1957, Serial No. 672,697

2 Claims. (Cl. 172—691)

This invention relates to an agricultural implement, and more particularly to a device for lifting or raising vines.

The object of the invention is to provide an agricultural implement which is adapted to be used for raising or lifting vines, as for example sweet potato vines, whereby the vines can be readily chopped up or beat up by a conventional beater mechanism.

Another object of the invention is to provide a vine lifting attachment for use with a shredding or beating machine, wherein vines such as sweet potato vines can be lifted to the desired elevation so that they can be conveniently fed or directed into the shredding machine so that the vines can be readily shredded or disintegrated, the vine lifting attachment of the present invention including a plurality of pointed plates or teeth which can be adjusted to different positions as desired.

A further object of the invention is to provide a vine lifting attachment which is extremely simple and inexpensive to manufacture.

Other objects and advantages will be apparent during the course of the following description.

In the accompanying drawings, forming a part of this application, and in which like numerals are used to designate like parts throughout the same, Figure 1 is a side elevational view of the vine lifting attachment of the present invention.

Figure 1:
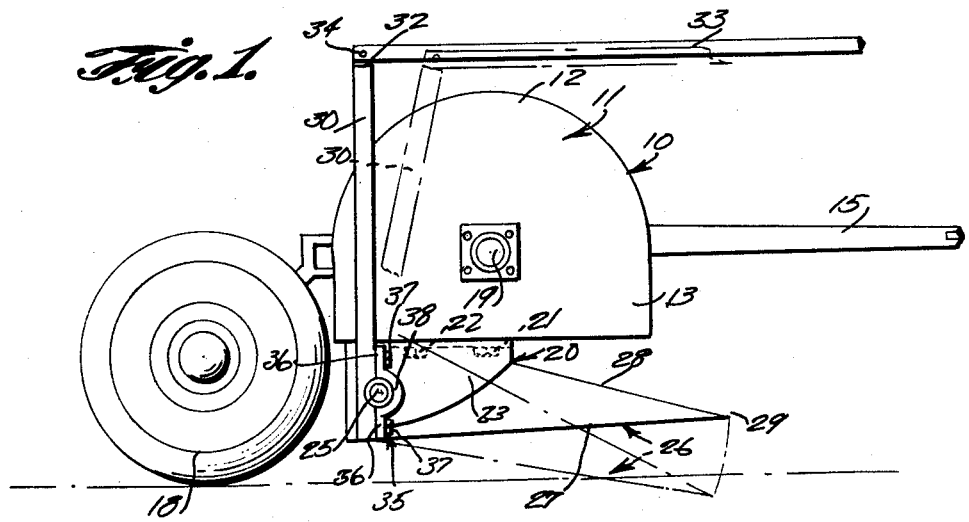
Figure 2:
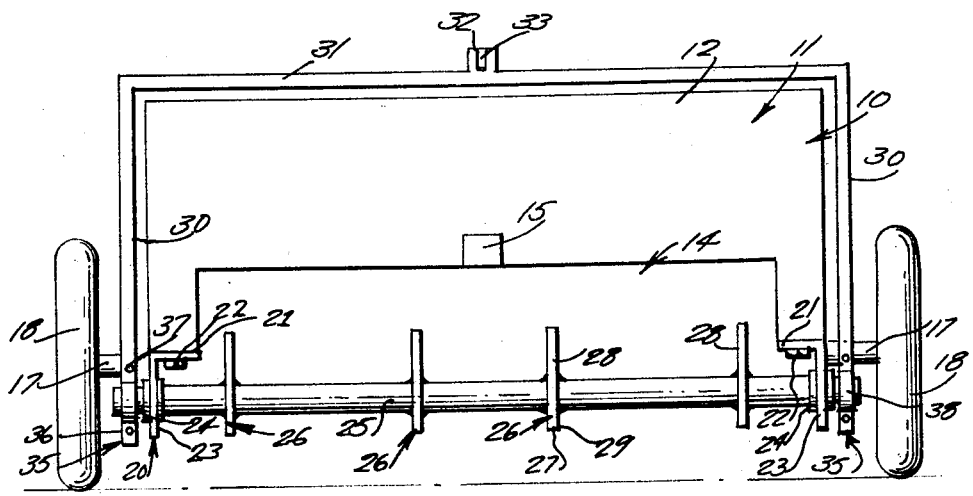
Figure 2 is a front elevational view of the vine lifting attachment, and showing the attachment connected to a beating or shredding machine.
Figure 3:
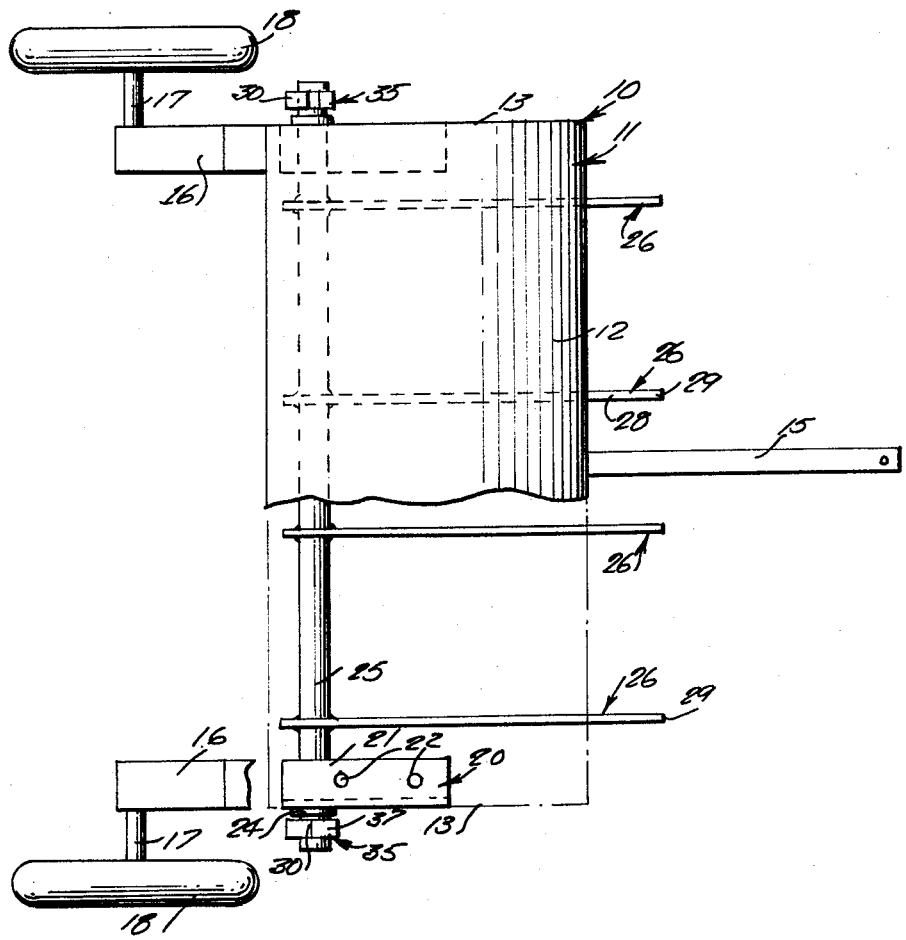
Figure 3 is a top plan view illustrating the present invention, and with parts broken away and in section.

Referring in detail to the drawings, the numeral 10 indicates a conventional beater or shredder which includes a housing 11, and the housing 11 includes a main portion 12 and end walls 13. The lower portion of the housing 11 may be cutaway or recessed as at 14, and a tongue or drawbar 15 extends forwardly from the housing 11 whereby the shredding or beating machine 10 can be readily attached behind and pulled by a tractor or the like.

Extending rearwardly from the ends of the housing 11 and secured thereto are beams 16, and extending outwardly from each beam 16 is an axle 17, the axles 17 serving to support ground engaging wheels 18. The numeral 19 indicates a shaft which extends through the housing 11, and the shaft 19 may form part of the conventional shredding mechanism which is arranged within the housing.

The present invention is directed to a vine lifting attachment for use with the beater 10, and the vine lifting attachment is adapted to be used for raising or lifting vines such as sweet potato vines whereby these vines can be effectively or readily worked on or shredded by the beater 10.

The vine lifting attachment of the present invention includes a pair of L-shaped brackets which are each indicated generally by the numeral 20. Each bracket 20 includes an upper horizontally disposed flange 21 which is secured to the lower end portion of the housing 11 through the medium of suitable securing elements such as bolts 22. Each bracket 20 further includes a vertically disposed wall member 23, and bearing 24 are supported by the wall members 23. A horizontally disposed axle or shaft 25 extends thorugh the pair of bearings 24, and a plurality of plates 26 are secured to the shaft 25 in any suitable manner, as for example by welding. Each of the plates 26 has a substantially triangular shape and each includes a lower surface 27, an upper inclined surface 28, and a pointed front end 29.

A means is provided for adjusting the positions of the plates 26, so that for example the plates 26 can be moved from the solid line position shown in Figure 1 to the broken line position shown in Figure 1. This means comprises a pair of bars 30 which are arranged adjacent the ends of the housing 11, and a crosspiece 31 extends between the upper ends of the bars 30 and is secured thereto. Lugs 32 extend upwardly from the crosspiece 31, and a tongue or lever 33 is pivotally connected between the lugs 32 by means of pivot pin 34, Figure 1. The bars 30 are connected to the ends of the shaft 25 through the medium of clamps 35, and each of the clamps 35 includes end portions 36 which are secured to the bars 30 by suitable securing elements such as bolts 37. Each clamp 35 further includes an intermediate curved portion 38 which engages the adjacent end of the shaft 25. Thus by moving the lever 33 until the desired position of the plate 26 with relation to the surface of the ground is obtained the bolts 37 may be tightened to cause the clamps 35 to firmly grip and retain the shaft 25 in the desired position.

From the foregoing, it is apparent that there has been provided a vine lifting attachment which is especially suitable for use with a beating or shredding machine such as the shredding machine 10. In use, the member 15 is adapted to be connected to a suitable towing vehicle such as a tractor, and the beater 10 includes the housing 11 which has the usual beating or shredding mechanism therein. Thus. material such as the vines which are directed or fed into the housing 11 will be shreadded or pulverized in the usual manner. The housing 11 has the shaft 19 extending therethrough, and the shaft 19 may have the usual shredding blades mounted thereon. The housing 11 is supported by the pair of ground engaging wheels 18 which extend rearwardly from the housing.

According to the present invention there is provided a vine lifting attachment, and the vine lifting attachment includes a horizontally disposed shaft 25 which is journaled in the bearings 24 which are supported by the pair of brackets 20. The pair of brackets 20 have their flanges 21 secured to the housing 11 through the medium of the bolts 22, and secured to the shaft 25 and extending therethrough is the plurality of triangular shaped blades or teeth 26. Thus for example by positioning or moving the blades 26 from the solid line position shown in Figure 1 to the broken line position shown in Figure 1, it will be seen that as the beater 10 moves forwardly, the pointed front ends 29 of the blades 26 will engage the ground or soil whereby any vines adjacent thereto such as sweet potato vines will be raised, and such vines will be guided rearwardly along the inclined surfaces 28 so that these vines will be directed into the beater housing 11 whereby the vines will be efficiently shredded or pulverized. The pair of bars 30 are connected to the ends of the shaft 25 through the medium of the clamps 35, and by shifting the lever 33 from the solid line position of Figure 1 to the broken line position of Figure 1, or vice versa, it will be seen that the shaft 25 can be rotated in the bearings 24 and this movement of the shaft 25 will result in corresponding movement of the plates 26 so that the plates 26 can be positioned in different angular positions, as for example as shown by the solid and broken lines in Figure 1.

The vine lifting attachment of the present invention is adapted to be used with a multiple row beater wherein the beater is adapted to be used for shredding sweet potato vines. The heater 10 is of conventional construction and is used for removing the vines before harvesting. Such vines are a problem to farmers when the farmers are digging out sweet potatoes and without the vine lifting attachment of the present invention, the beater cannot cut the vines close enough to the ground without damage to the crop or to the equipment itself.

The vine lifting attachment of the present invention is a heavy duty implement and is constructed so that the pointed ends of the plates or blades 26 will ride below the top surface of the ground without damage to the crops. The parts can be made of any suitable material and in different shapes or sizes. The plates 26 are secured as by welding to the shaft 25 and the spacing between the plates 26 conforms to the conventional spacing of sweet potato rows. The brackets 20 serve to connect the device to the bottom portions of the rotor beater 10.

When the device is being used, the vines slide up the inclined surfaces 28 and the front portions of the plates or fins 26 may extend into the ground approximately one inch. In actual practice, the vines and leaves are separated and shred so as to facilitate digging of the hills or rows without further need of vine cutting. Thus, it will be seen that there has been provided a means for feeding vines into the rotary beater. The vine lifting device is ruggedly constructed and it will permit a sweet potato digger to dig freely and clear all the vines which cross the aisles or rows.

While I have shown a preferred form of my invention, I reserve all rights to such modifications as properly fall within the scope of the invention as claimed.

I claim:

1. In a vine lifting attachment for use with a rotary beater of the type including a hollow housing, beams extending rearwardly from the ends of said housing, axles supported by said beams, wheels connected to said axles, a tongue extending forwardly from said housing and adapted to be connected to a towing vehicle, said vine lifting attachment including a pair of spaced apart L-shaped brackets secured to the lower end portions of said housing and each of said brackets including a horizontally disposed flange secured to said housing, and each bracket further including a vertically disposed wall member depending from said flange, bearings supported by said wall members, a horizontally disposed shaft extending through said bearings, a plurality of spaced parallel vertically disposed plates extending forwardly from said shaft and secured thereto, a pair of spaced parallel vertically disposed bars arranged adjacent the outer ends of said housing, clamps connecting the lower ends of said bars to said shaft, a horizontally disposed crosspiece extending between the upper ends of said bars and secured thereto, and a lever extending forwardly from said crosspiece and connected thereto.

2. In a vine lifting attachment for use with a rotary beater of the type including a hollow housing, beams extending rearwardly from the ends of said housing, axles supported by said beams, wheels connected to said axles, a tongue extending forwardly from said housing and adapted to be connected to a towing vehicle, said vine lifting attachment including a pair of spaced apart L-shaped brackets secured to the lower end portions of said housing and each of said brackets including a horizontally disposed flange secured to said housing, and each bracket further including a vertically disposed wall member depending from said flange, bearings supported by said wall members, a horizontally disposed shaft extending through said bearings, a plurality of spaced parallel vertically disposed plates extending forwardly from said shaft and secured thereto, a pair of spaced parallel vertically disposed bars arranged adjacent the outer ends of said housing, clamps connecting the lower ends of said bars to said shaft, a horizontally disposed crosspiece extending between the upper ends of said bars and secured thereto, and a lever extending forwardly from said crosspiece and connected thereto, each of said plates having a substantially triangular shape and each including a lower flat surface and an upper inclined surface, the front ends of said plates being pointed.

References Cited in the file of this patent

UNITED STATES PATENTS

| 1,883,694 | Goble | Oct. 18, 1932 |
| 2,465,488 | Sears et al. | Mar. 29, 1949 |
| 2,631,418 | Ronning | Mar. 17, 1953 |
| 2,706,877 | Caldwell | Apr. 26, 1955 |

FOREIGN PATENTS

| 107,558 | Australia | May 26, 1939 |
| 701,836 | France | Jan. 13, 1931 |